Feb. 4, 1969    M. BOBRICK    3,426,190
SUPPORT ARMS FOR LAMPS AND THE LIKE
Filed Nov. 7, 1966    Sheet 1 of 2
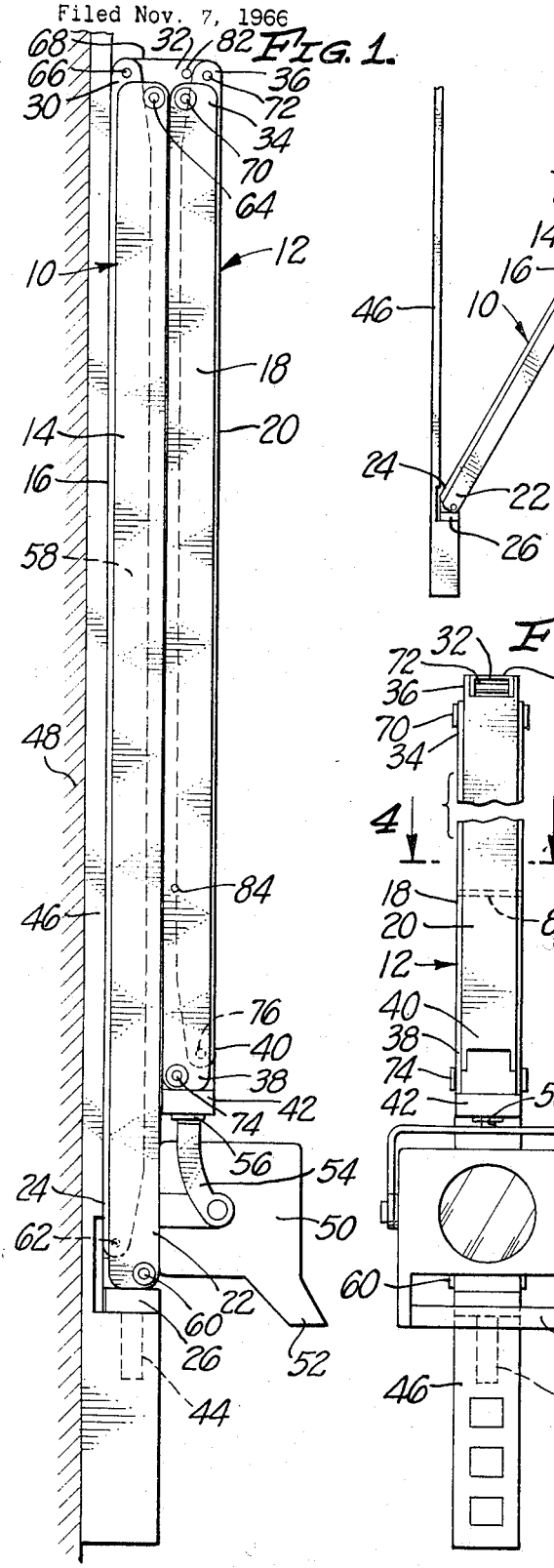
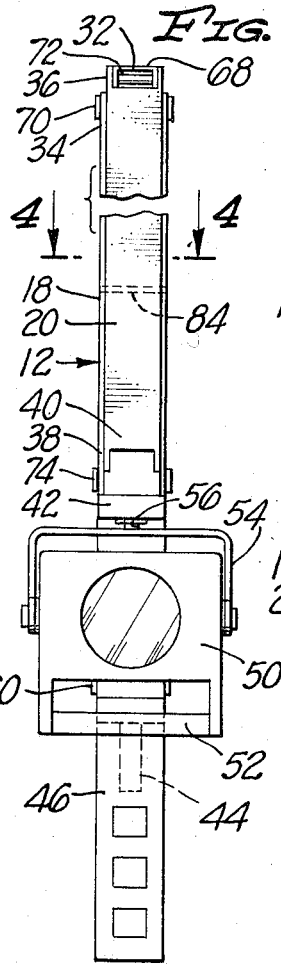
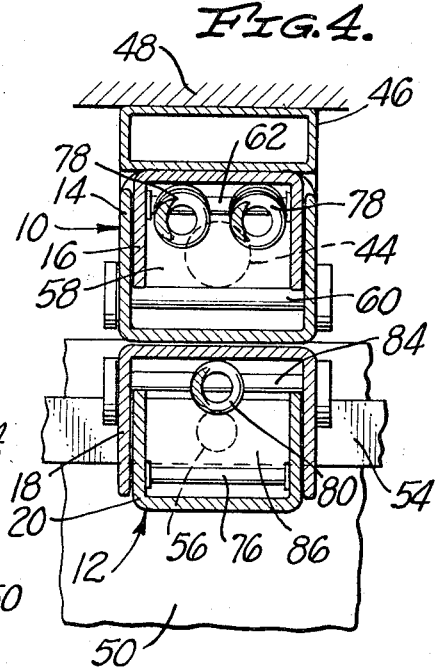
INVENTOR
MITCHELL BOBRICK
BY
MAHONEY & HORNBAKER
ATTORNEYS

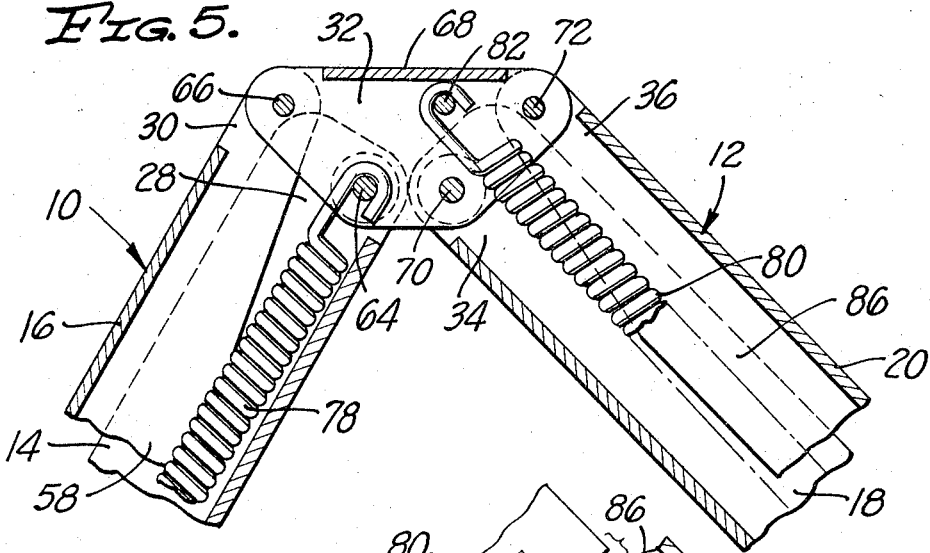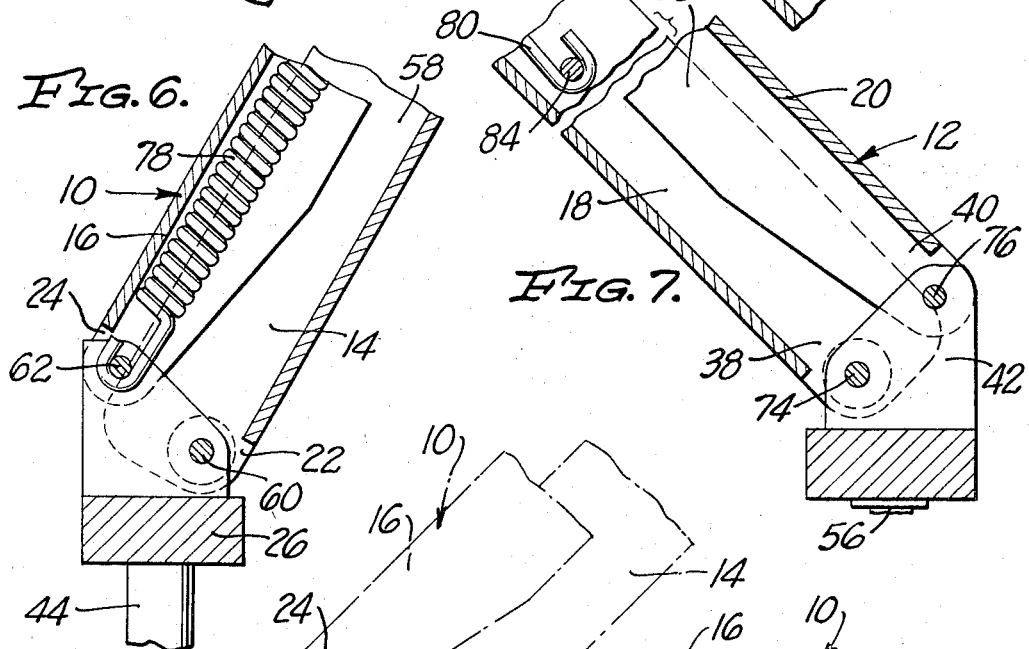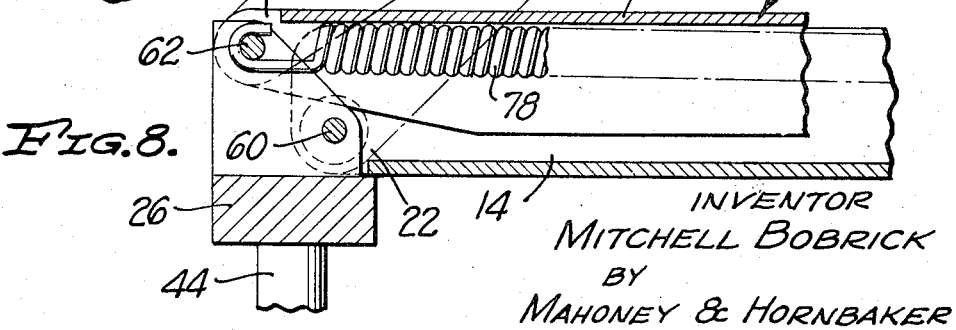

United States Patent Office 3,426,190
Patented Feb. 4, 1969

3,426,190
SUPPORT ARMS FOR LAMPS AND THE LIKE
Mitchell Bobrick, Pacific Palisades, Calif., assignor to P. N. Luminous Equipment Co., Franklin Park, Ill.
Filed Nov. 7, 1966, Ser. No. 596,380
U.S. Cl. 240—73
Int. Cl. F21s 1/02, 5/00
4 Claims

ABSTRACT OF THE DISCLOSURE

Two sets of support arms are end pivotally connected, each set being comprised of preferably opposed, U-shaped cross section arms which are at least partially transversely internested forming substantially closed arm assemblies with control chambers enclosed therein. The end pivotal connection of each arm of each set mounts the arms of each set at least transversely shiftable, and also preferably longitudinally shiftable, relative to each other while still maintaining said transversely closed assembly during arm pivotal movement. Control springs are contained within the arm assembly control chambers regulating arm pivotal movements.

---

This invention relates to support arms of the type commonly known as extensible or foldable support arms, wherein said arms support devices such as lamps movable both horizontally and vertically relative to a supporting surface. The support arms are connected to the mounting surface and arranged for pivotal movement in a vertical plane, and also may be arranged for pivotal movement in a horizontal plane relative to said mounting surface.

Furthermore, the particular device may be mounted on said arms for various movements relative to said arms and while said arms remain stationary, as well as movement with said arms during arm pivot movement into selected positions in which said arms retain said device stationary in said selected positions.

More particularly, this invention relates to support arms of the foregoing type wherein a single arm assembly or a plurality of arm assemblies may be connected supporting the particular device, each said arm assembly preferably including merely two pivotal support arms in combination with end connection members forming a self-enclosing assembly, thereby eliminating the necessity of various covers, as have been prevalent in the prior constructions.

In the individual arm assemblies, the two support arms thereof may be interrelated in such a manner as to form an arm enclosing chamber within which may be contained some form of resilient means, such as a spring or springs, for controlling the pivotal movement of the particular arm assembly. The resilient means within said arm chamber is arranged for reacting to the arm assembly pivotal movement and to retain said arm assembly in any selected position throughout the scope of said movement.

Many prior forms of support arms for supporting devices such as lamps and the like have heretofore been provided, and many of such prior constructions have supported said devices movable in the general manner hereinbefore set forth. Prior to the present invention, however, all such arm constructions and assemblies have been relatively complex in nature, requiring complicated pivotal arrangements and arm connections, along with multiple complicated spring systems.

Furthermore, all such prior support arm assemblies have included covers mounted thereon and enclosing the support arms and spring systems, said covers usually being formed of sheet metal and being removably secured to one or both of the support arms in the arm assembly. As a result, the prior support arm constructions and assemblies of the type herein involved have been necessarily relatively expensive to provide, both from the material and labor standpoint.

It is, therefore, an object of my invention to provide support arms for lamps and the like in which the two support arms required for each arm assembly are formed and interrelated relative to each other so as to provide a self-enclosing arm assembly which does not require the addition of the usual covers heretofore required by the prior constructions. Furthermore, not only do the two support arms provide a self-enclosing arm assembly, the unique manner of assembly of such arms forms an enclosed chamber within which may be mounted the necessary resilient means for reacting to and controlling the pivotal movement of the arm assembly. Thus, the arm assembly is of maximum simplicity and provides an esthetically pleasing effect.

It is a further object of my invention to provide support arms for lamps and the like of foregoing unique arm assembly wherein the resilient means required for controlling the pivotal movement of the assembly is not of a complicated nature, but rather may be of relatively simple form and easily contained within the arm assembly chamber specifically provided therefor. Such resilient means may consist of one of many forms, for instance, one or several extensible springs within each arm assembly chamber, said springs being end-connected preferably extensible longitudinally of the arms with the opposed spring ends transversely offset relative to said arms so as to react upon selected pivotal movement of said arms. Furthermore, the resilient or spring force of each arm assembly is predetermined so as to balance the arms and the device supported thereon during pivotal movement thereof and to maintain said arms and device stationary in any selected pivoted position.

It is also an object of my invention to provide support arms for lamps and the like in which, despite the simplicity of each arms assembly, the pivotal connections between the arm ends and the end connection members of said assembly may be arranged for maintaining said end connection members in a particular predetermined relationship relative to each other throughout the entire pivotal movement of the arm assemblies.

For instance, assuming that a lamp is supported on one or more of the arm assemblies for pivotal movement therewith, such lamp will remain in a preset position relative to the supporting surface upon which the arm assemblies are mounted despite the fact that said lamp is capable of being moved both vertically and horizontally relative to said supporting surface through the pivotal connection of the support arm assembly. The pivotal connections of the arms of an arm assembly to the connection members thereof for maintaining this relationship is such that the individual arms will move both longitudinally and transversely relative to each other during the pivotal movement of the overall assembly while still remaining in the unique transversely closed relationship, as hereinbefore set forth.

Other objects and advantages of the invention will be apparent from the following specification and the accompanying drawings which are for the purpose of illustration only, and in which:

FIG. 1 is a fragmentary, side elevational view showing support arm assemblies embodying the principles of the present invention for pivotally supporting a lamp on a wall surface;

FIG. 2 is a fragmentary, front elevational view of the support arm arrangement of FIG. 1;

FIG. 3 is a reduced, side elevational view similar to FIG. 1, but showing the support arm assemblies and lamp in a different pivotal position;

FIG. 4 is an enlarged, fragmentary, horizontal, sectional view taken along the broken line 4—4 in FIG. 2;

FIG. 5 is an enlarged, fragmentary, vertical, sectional view showing the pivotal connections between the two arm assemblies of FIG. 3;

FIG. 6 is an enlarged, fragmentary, vertical, sectional view showing the pivotal connections between the inner arm assembly and the stationary end connection member for supporting the arm assemblies on a stationary mounting member;

FIG. 7 is an enlarged, fragmentary, vertical sectional view showing the pivotal connections between the outer arm assembly and the movable end connection member for supporting the lamp pivotally movable with the arm assemblies; and FIG. 8 is a view similar to FIG. 6 showing the inner arm assembly in different pivoted positions relative to the stationary end connection member.

Referring to the drawings, an embodiment of the support arms of the present invention is arranged as two support arm assemblies, an inner support arm assembly generally indicated at 10 and an outer support arm assembly generally indicated at 12, with the inner assembly including a pair of generally longitudinally co-extensive support arms 14 and 16 and the outer assembly including generally longitudinally co-extensive support arms 18 and 20. First ends 22 and 24 of the support arms 14 and 16 are pivotally connected to an inner end connection member 26, and second ends 28 and 30 of said support arms 14 and 16 are pivotally connected to an intermediate end connection member 32. First ends 34 and 36 of the support arms 18 and 20 are pivotally connected to the intermediate end connection member 32, and second ends 38 and 40 of said support arms 18 and 20 are pivotally connected to an outer end connection member 42.

The inner end connection member 26 is secured rotatable or pivotal in a horizontal plane through a vertical mounting pin 44 received in a mounting bracket 46 secured to the surface of a wall 48. A typical lamp 50 having an adjustment handle 52 is adjustably supported through a yoke 54 and vertical mounting pin 56 on the outer end connection member 42, said yoke and mounting pin also being rotatable or pivotal in a horizontal plane relative to said outer end connection member. Thus, the inner and outer support arm assemblies 10 and 12 and the lamp 50 are pivotal in a horizontal plane relative to the mounting bracket 46 through the inner end connection member 26, and the lamp 50 is pivotal in a horizontal plane relative to the outer end connection member 42 and pivotal in a vertical plane relative to the yoke 54, all of which is independent of the particular pivoting of the inner and outer support arm assemblies 10 and 12 in a vertical plane relative to the inner, intermediate and outer end connection members 26, 32 and 42.

More particularly to the arrangement of the inner and outer supporting arm assemblies 10 and 12 and the pivotal connections thereof to the inner, intermediate and outer end connection members 26, 32 and 42, said arrangement being of importance to the principles of the present invention, the support arms 14 and 16 of the inner support arm assembly 10 and the support arms 18 and 20 of the outer support arm assembly 12 are interrelated in said assemblies so as to form substantially transversely closed support arm assemblies. As can be seen particularly in FIGS. 1 through 4, the support arms 14 and 16 of the inner assembly 10 and the support arms 18 and 20 of the outer assembly 12 make up and form the entire outside appearance of said assemblies and do not require the usual various outside covers heretofore required in the prior constructions, that is, outer surfaces of the various support arms define the transverse perimeter of the particular assembly as shown. Furthermore, as can be clearly seen from a comparison of FIGS. 1, 3 and 5 through 8, the various support arms of the support arm assemblies 10 and 12 maintain their particular interrelation to provide the closed arm assemblies throughout the pivotal movement of the arm assemblies relative to the various end connection members 26, 32 and 42, all of which will be hereinafter discussed more in detail.

Referring specifically to the inner support arm assembly 10, both of the support arms 14 and 16 are U-shaped in transverse cross section, being assembled with the U openings thereof transversely opposed and with the support arm 16 received partially transversely nested in the support arm 14. The support arms 14 and 16 thereby form a longitudinally extending, resilient means chamber 58 within the inner arm assembly 10 longitudinally between the inner and intermediate end connection members 26 and 32. Furthermore, the first ends 22 and 24 of the support arms 14 and 16 are separately pivotally connected to the inner end connection member 26 respectively by pivot pins 60 and 62, and the second ends 28 and 30 of said support arms 14 and 16 are separately pivotally connected to the intermediate end connection member 32 respectively by pivot pins 64 and 66, in each case, said support arms being pivotal relative to said end connection members in a vertical plane.

The first end pivot pins 60 and 62 of the support arms 14 and 16 are equally transversely spaced relative to the second end pivot pins 64 and 66 of said support arms, and said pivot pins are received through the support arms so as to maintain said support arms parallel throughout the pivotal movement thereof relative to the inner and intermediate end connection members 26 and 32. The first end pivot pins 60 and 62 are also angularly positioned relative to each other in the inner end connection member 26 in the same uniform angular positioning as the second end pivot pins 64 and 66 in the intermediate end connection member 32.

Thus, with the assembled arrangement shown of the support arms 14 and 16 by the pivot pins 60 through 66 on the inner and intermediate end connection members 26 and 32, a particular relative relationship of positioning of the inner and intermediate end connection members is established, which particular positioning or relationship of said inner and intermediate end connection members is maintained substantially exactly the same throughout the entire pivotal movement of the support arms 14 and 16 relative to said end connection members. Such relative positioning and the maintaining of said relative positioning throughout the pivotal movement of the support arms 14 and 16 results in any part or surface on the intermediate end connection member 32 remaining in the same relationship with respect to a horizontal plane throughout and despite the vertical pivotal movement of the support arms 14 and 16 carrying said intermediate end connection member, for instance, a top surface 68 of the intermediate end connection member happens to be substantially horizontal in the vertical position of the inner support arm assembly 10, as shown in FIG. 1, and such top surface will remain horizontal despite the vertical pivotal movement of the inner support arm assembly through approximately 45° to vertical shown in FIG. 3, and to horizontal, as shown in FIG. 8. At the same time, in order to permit said pivotal movement of the inner support arm assembly 10 in the vertical plane relative to the inner and intermediate end connection members 26 and 32, during said pivotal movement, the support arms 14 and 16 shift both longitudinally and transversely relative to each other, while at all times remaining in the previously described interrelated, in this case, internested arm assembly.

The combined longitudinal and transverse shifting of the support arms 14 and 16 within the inner support arm assembly 10 can be more clearly understood by a comparison of FIG. 1 with FIGS. 3 and 5 through 7, and by comparison of FIGS. 3 and 5 through 7 with FIG. 8.

As shown in FIG. 1, the inner support arm assembly 10 extends vertically and the support arms 14 and 16 thereof are transversely nested in a particular relationship. As shown in FIGS. 3, 5 and 6, the inner support arm assembly 10 extends approximately 45° to vertical and the support arms 14 and 16 thereof have shifted both longitudinally and transversely, the support arm 16 having moved transversely outwardly relative to the support arm 14 into a slightly lesser nested position. As shown in FIG. 8, the inner support arm assembly 10 is in horizontal position and the support arms 14 and 16 have shifted still further longitudinally, while the transverse shifting thereof has resulted in the support arm 16 again more fully transversely nesting with the support arm 14 substantially returning to the transverse positioning of FIG. 1.

The pivotal connection of the outer support arm assembly 12 to the intermediate and outer end connection members 32 and 42 is essentially the same as that just described relative to the inner support arm assembly 10. Pivot pins 70 and 72 similarly connect the first ends 34 and 36 of the support arms 18 and 20 to the intermediate end connection member 32, and pivot pins 74 and 76 similarly connect the second ends 38 and 34 of said support arms to the outer end connection member 42. The same combined longitudinal and transverse shifting of the support arms 18 and 20 takes place upon the vertical pivotal movement of the outer support arm assembly 12 relative to the intermediate and outer end connection members 32 and 42, and the same preset relationship between the intermediate and outer end connection members is maintained throughout said pivotal movement.

In the particular embodiment shown, the outer support arm assembly 12 is shorter longitudinally than the inner support arm assembly 10, but this is without consequence to the principles of the present invention. Furthermore, in the particular embodiment shown, the pivot pin 72 which connects the first end 36 of the support arm 20 to the intermediate end connection member 32 is actually an axially split pin for a purpose to be hereinafter described. Otherwise, the support arms 18 and 20 are U-shaped in transverse cross section and assembled transversely interrelated in the same manner as the support arms 14 and 16 of the inner support arm assembly 10.

Thus, upon pivotal movement of the inner and outer support arm assemblies 10 and 12 relative to the inner, intermediate and outer end connection members 26, 32 and 42, the various support arms retain the transversely closed assembly described so as to provide the inner and outer support arm assemblies transversely closed at all times. Also, the particular relationship of the various pivotal connections of the inner and outer support arm assemblies 10 and 12 to the inner, intermediate and outer end connection members 26, 32 and 42 maintains the constant, preset relationship between the various end connection members despite the particular pivotal positioning of the inner and outer support arm assemblies. As a consequence, the lamp 50 connected to the outer end connection member 42 will maintain the exact positioning relative to the mounting bracket 46 throughout such support arm assembly pivotal movement and despite such pivotal movement, although at any time, the lamp may be variously pivoted relative to the outer end connection member by virtue of the particular mounting described through the yoke 54 and mounting pin 56.

A resilient extension member in tthe form of a pair of coiled tension springs 78 are positioned within the resilient means chamber 58 of the inner support arm assembly 10, said springs extending generally longitudinally of said support arm assembly and being connected at the one end to the pivot pin 62 and at the other end to the pivot pin 64 so as to react between the support arms 14 and 16 during the transverse shifting of said support arms in the pivotal movement of the inner support arm assembly 10. A similar resilient member in the form of a spring 80 is end connected extending generally longitudinally of the outer support arm assembly 12 between a connection pin 82 secured through the intermediaate end connection member 32 and a connection pin 84 secured through the support arm 18, said spring 80 also reacting to the transverse shifting of the support arms 18 and 20 during pivotal movement of the outer support arm assembly 12. The various springs 78 and 80 are precalculated for proper strength based on the weights of the inner and outer support arm assemblies 10 and 12 and the weight of the lamp 50, as well as the weights of all of the other components involved, for retaining the inner and outer support arm assemblies stationary in any pivoted position of such support arm assemblies in which they may be placed, always as a result of said springs reacting to the transverse shifting of the various support arms 14 through 20 of the inner and outer support arm assemblies.

In each instance, the particular strengths of the springs 78 and 80, the number of said springs and the particular manner of end connection thereof within the resilient means chambers 58 and 86 will be determined by the respective weights of the various components and the particular element, such as the lamp 50, supported thereby. In every case, however, the important criteria is that the particular resilient means, whether springs, such as the springs 78 and 80 or otherwise, will always react at least to the transverse shifting of the support arms 14 through 20 in the particular inner and outer support arm assemblies 10 and 12 during pivotal movement of said support arm assemblies. Furtthermore, the particular resilient means is preferably in each case precalculated in a known manner so as to retain the inner and outer support arm assemblies 10 and 12 stationary in any pivoted position in which they may be placed.

As an example of particular dimensioning of the various components of the embodiment of support arm assemblies shown, assume that the support arms 14 and 16 of the inner support arm assembly 10 are each 25⁵⁄₁₆ inches in longitudinal length between the pivot pins 60 through 66 thereof, and the support arms 16 and 18 of the outer support arm assembly 12 are each 20¹³⁄₁₆ inches in longitudinal length between the pivot pins 70 through 76 thereof, also, assume that the support arms 14 through 20 are aluminum extrusions and the lamp 50 has a weight of approximately 1¼ pounds. Finally, assume that the intermediate and outer end connection members 32 and 42 are formed substantially as shown.

In this case, springs 78 of the inner support arm assembly 10 may be formed of 0.085 inch diameter spring wire having 220 coils of ¹³⁄₃₂ inch diameter and a 25 inch free length, with a preload of 22 pounds and a rate of 10.4 pounds per inch. The spring 80 of the outer support arm assembly 12 may be formed of 0.085 inch diameter spring wire having 110 coils of ¹³⁄₃₂ inch diameter and 13½ inch free length, with no preload and a rate of 20.6 pounds per inch. Each of the springs 78 and 80 are slightly extended for assembly with the appropriate pivot and connection pins and, as stated, will retain the inner and outer support arm assemblies 10 and 12 substantially stationary in any pivoted position in which these support arm assemblies are placed.

I have provided, therefore, according to the principles of the present invention, support arms for lamps and the like in which the two support arms 12 and 14 or 16 and 18 required for each of the inner and outer support arm assemblies 10 and 12 are interrelated in assembly relative to each other so as to provide self-enclosing arm assemblies which do not require the addition of the usual covers hereinbefore required by the prior constructions. Additionally, the particular unique interrelationship between the support arms of each of the support arm assemblies inherently provides a longitudinally extending, transversely closed resilient means chamber within which may be mounted the necessary resilient means, in this case either the springs 78 or the spring 80, for reacting to and controlling the pivotal movement of the particular arm assembly. Thus, each of the inner and outer support arm assemblies 10 and 12 are truly of an extremely simple construction, each requiring only two support arms and the particular resilient means reacting therebetween.

During the pivotal movement of each of the inner and outer support arm assemblies 10 and 12, the important movement between the support arms 14 and 16 or 18 and 20 thereof which must be controlled by the particular resilient means in order to control the pivotal movement of said support arm assemblies is that of transverse shifting between the support arms of each assembly. In view of this relatively simple interrelation between the support arms of each assembly, it is possible to provide relatively simple resilient means, such as the springs 78 or spring 80 end connected extending longitudinally of the support arms and appropriately arranged to provide the reaction required in the particular situation. For this reason, the support arm assemblies of the present invention may be readily adapted to any of a multiplicity of uses with relatively easily determined changes therein.

I claim:

1. In support arms for lamps and the like, the combination of at least two sets of a pair of longitudinal coextensive internested support arms, with the pair of arms in each set movable longitudinally and transversely independently with respect to each other, wherein the improvement comprises
    (a) first and second end connection members pivotally supported within and closing corresponding opposite ends of each pair of internested support arms,
    (b) fixed transversely spaced first pivot means connecting said first end connection member within the corresponding ends of one pair of internested arms,
    (c) second transversely spaced pivot means connecting said second end connection member to and within the corresponding ends of the other pair of internested support arms,
    (d) an intermediate connection member within and closing the opposing corresponding other ends of each of said pair of internested supporting arms,
    (e) separate pivot means between said intermediate connection member and each arm of each pair of arms with the pivot means of the confronting arms of each pair of arms spaced apart such that such spacing permits the two sets of arms to be disposed in side-by-side relation with each pair of arms movable therefrom and relative to said intermediate connection member independently of corresponding movement by the other pair of said arms, and
    (f) resilient means within each set of internested arms and connected to said intermediate connection member so as to react to and permit independent pivotal movement of each of said pair of arms relative to each other while balancing each pair of said arms in a stationary position in any selected pivoted position.

2. In support arms for lamps and the like as defined by claim 1, wherein said resilient means within each set of internested arms comprise coiled tension springs extending longitudinally between each internested pair of arms of each set of arms, with said springs connected between said arms and said intermediate connection member so as to react to and permit independent pivotal movement of each arm of each pair of arms and each set of arms relative to each other while balancing each pair of said arms in a stationary position in any selected pivoted position.

3. In support arms for lamps and the like as defined by claim 1, wherein each arm of each pair of arms is generally U-shaped in transverse cross section and disposed in opposing relation so as to be at least partially nested together so as to form therebetween a chamber for housing said resilient means.

4. In support arms for lamps and the like as defined by claim 2, wherein each arm of each pair of arms is generally U-shaped in transverse cross section and disposed in opposing relation so as to be at least partially nested together so as to form therebetween a chamber for housing said coiled springs.

References Cited

UNITED STATES PATENTS

| | | | |
|---|---|---|---|
| 641,748 | 1/1900 | Smith | 240—81 |
| 2,911,525 | 11/1959 | Strom | 240—73 |
| 3,188,460 | 6/1965 | Thorsen et al. | 240—73 |
| 1,078,577 | 11/1913 | Fox | 248—280 |
| 899,781 | 5/1908 | Anderson | 248—280 |
| 906,874 | 12/1908 | Hallowell | 248—280 |
| 2,416,910 | 3/1947 | Crosby et al. | 248—280 |

FOREIGN PATENTS

| | | |
|---|---|---|
| 1,206,176 | 5/1960 | France. |
| 237,596 | 3/1962 | Australia. |

NORTON ANSHER, *Primary Examiner.*

R. A. SCHROEDER, *Assistant Examiner.*

U.S. Cl. X.R.

248—281, 280